United States Patent Office 2,890,214
Patented June 9, 1959

2,890,214
RECOVERY PROCESS FOR POLYETHYLENE

Edgar Nixon Brightbill and Kaare Paul Lindland, Wilmington, Del., assignors to E. I. du Pont de Nemours and Company, Wilmington, Del., a corporation of Delaware No Drawing. Application June 21, 1956
Serial No. 592,725

10 Claims. (Cl. 260—94.9)

This invention relates to an improved method for separating hydrocarbon polymer from mixtures produced by the polymerization of a terminally unsaturated olefin in the presence of catalysts which are formed by admixing a halide of a transition element such as titanium with a metal-containing reducing agent, such as an organometallic compound, a metal hydride or an active metal.

It has recently been discovered that the products obtained from reacting compounds, and preferably halides, of transition elements such as titanium, vanadium, molybdenum found in groups IV$b$, V$b$, and VI$b$ of the periodic table of elements with metallic reducing agents such as metal alkyls, metal hydrides and alkali metals, are extremely active polymerization catalysts, which will polymerize ethylene to a high molecular weight polymer relatively free from branching at low pressures and temperatures. These catalysts have been referred to as coordination catalysts, since it is believed that the reduced transition element forms coordinate bonds with ethylene and thereby causes polymerization of ethylene to linear polymers of unique properties. The activity of coordination catalysts is such that they also polymerize terminally unsaturated olefins such as propylene and butene and homologs thereof to high molecular weight solids, which are useful as plastics.

The process employed to polymerize terminally unsaturated hydrocarbons by coordination catalysts may be carried out over a wide range of conditions. Thus, reaction temperatures may be varied from below 0 to above 250° C. and pressures may be varied from atmospheric pressure to pressures exceeding 1000 atmospheres. Generally, the polymerization is carried out in the presence of an inert, liquid, hydrocarbon medium containing the catalyst.

The coordination catalysts, however, have the disadvantage of leaving metallic residues intimately admixed with and possibly bonded to the polymer. If these catalyst residues are not removed from the polymer, degradation and discoloration of the polymer will occur when the polymer is heated. Such degradation and discoloration is extremely undesirable where polymers are melt fabricated and it is, therefore, necessary to remove the metallic catalyst residues as completely as possible. Furthermore, the catalyst residues retained in the polymer will cause the corrosion of process equipment employed in the fabrication of the polymer. While it had been found, heretofore, that alcoholysis of the polymer obtained from coordination catalysts will cause the breaking of the metal to polymer bond and will also cause the solvolysis of the metal, there has, nevertheless, arisen a need for further improvements in the purification of polymers to remove remaining residues of the metallic catalyst in order to improve the quality of the resulting product.

In accordance with the present invention it has been discovered that metallic catalyst residues obtained in the polymerization of ethylene can be effectively removed by a process which comprises reacting at a temperature of 125° C. to 250° C. an alcohol with a polymerization mixture comprising a liquid hydrocarbon medium, a dissolved polymer of ethylene, and metallic catalyst residues, containing a transition element, the quantity of said alcohol being sufficient to convert the metallic residues to alcoholates and contacting said reaction mixtures at a temperature of 125° C. to 250° C. with an adsorbent selected from the class consisting of silica and alumina. In a specific embodiment of the present invention the process is carried out in a continuous manner, wherein the polymer solution is reacted with a branched chain alcohol, contacted with the adsorbent which is thereafter regenerated with steam or water at elevated temperatures and then recontacted with the polymer solution.

Although the process of the present invention is described in terms of an ethylene polymerization process, it is equally well applicable to a process for the polymerization of propylene, and homologs thereof and to the interpolymerization of terminally unsaturated hydrocarbon monomers with ethylene. Thus, catalyst residues obtained from the polymerization of terminally unsaturated olefins with a coordination catalyst may be readily removed from a solution of the polymer by adsorption on a silica or alumina adsorbent.

The catalyst residues removed by the process of the present invention are those obtained from the polymerization of ethylenically unsaturated compounds with a catalyst formed by admixing a salt and preferably a halide of a transition element selected from group IV$b$, V$b$ and VI$b$ of the periodic table of elements with an organometallic reducing agent having at least one metal to hydrocarbon bond such as metal alkyls and Grignard reagents. In place of the organometallic reducing agents, metal hydrides and alkali metals may also be employed as reducing agents.

As stated hereinabove, the polymerization of ethylene with a catalyst comprising the product formed from the reaction of a transition metal halide such as titanium, vanadium or zirconium and a metallic reducing agent such as a metal alkyl or metal aryl, a Grignard reagent, a metal hydride or an alkali metal is extremely reactive and may be carried out over a wide range of conditions. The preferred process, however, is one in which the polymer is formed as a solution in the inert hydrocarbon reaction medium. The polymer becomes sufficiently soluble in a hydrocarbon medium if the temperature is maintained above the melting point of the polymer; that is, approximately above 125° C. Such a process allows a good control over the polymerization and results in a product of improved quality. Although the present invention is especially adapted to such a process, it may also be applied to processes in which the polymerization is carried out at temperatures below the melting point of the polymer, but an additional step of heating the polymerization product until a solution of the polymer is achieved is required.

The product obtained from the polymerization of ethylene with a coordination catalyst at temperatures above 125° C. in the presence of an inert liquid hydrocarbon comprises the inert liquid hydrocarbon, dissolved unreacted monomer, dissolved polymer and the catalyst residues which may exist in the form of an insoluble complex or may be bonded to the polymer. It was found that branched chain alcohols will react with the insoluble and bonded catalyst residues to form soluble alcoholates, when added to the polymerization mixture in sufficient quantities. This reaction will go essentially to completion if the polymer is kept in solution and preferably at a temperature of 125° C. to 250° C. The quantity of the branched chain alcohol necessary to achieve the solvolysis should be at least the stoichiometric quantity necessary to form alcoholates with the catalyst. This quantity is readily calculated if the quantity of catalyst added to the polymerization is known. At the temperatures necessary to maintain the polymer in solution the solvolysis reaction occurs rapidly and, therefore, only stoichiometric quantites of the branched chain alcohol are necessary. In general, it is preferred to employ quantities in excess of the stoichiometric quantity of the branched chain alcohol necessary to form the alcoholates. Exceedingly large quantities of the branched alcohol are preferably avoided, since such large quantities may cause precipitation of the polymer. However, within the range necessary to achieve solubilization of the inorganic catalyst residues, the branched chain alcohols are readily compatible with the polymer solution and no precipitation of the polymer occurs at the temperatures employed. Although straight chain alcohols readily react with the catalyst to form alcoholates, their addition is not preferred, since these alcoholates are less readily adsorbed. By branch chain alcohols are meant those alcohols which contain carbon atoms having attached thereto two or three alkyl groups. Aromatic and cyclic alcohols may also be employed. The preferred branched chain alcohols are isopropyl alcohol and isobutyl alcohol. Higher branched chain alcohols are less preferred, since the rate of reaction decreases with increase in the length of the carbon chain. Ethylene present in the polymerization mixture is not detrimental to the process of the present invention, but is believed to be beneficial in that the ethylene is believed to react with the halogen acids, resulting from the reaction of the metallic residues with the alcohol, to form ethyl chloride, which is readily removable with the solvent and does not deleteriously affect the polymer. If desirable chelating agents for the metals may be employed in combination with the alcohols, chelated metallic catalyst residues are also adsorbed by the silica and alumina in the presence of the polymer at the elevated temperatures employed. Useful chelating agents are such compounds as acetyl acetone, etc.

The polymer solution obtained on addition of the alcohol is then contacted at temperatures sufficient to maintain the polymer in solution, e.g., temperatures of 125° C.–250° C., with an adsorbent selected from the class consisting of alumina and silica. It was discovered that even at the high temperatures employed, the soluble metal alcoholates are essentially completely adsorbed by the silica or alumina in the presence of the dissolved polymer. It is, of course, necessary to maintain the polymer in solution to successfully separate the catalyst residues from the polymer. The silica or alumina employed is readily regenerated by contacting the alumina or silica containing adsorbed metal alcoholates with steam at a temperature of 250° C. The efficiency of adsorption increases with the surface area of the adsorbent, and thus a small particle size is preferred. The adsorption may be carried out in a fixed bed or a moving bed and by various other means known to those skilled in the art. The contact time of the polymer solution with the adsorbent is not critical, the adsorption being very rapid.

The thus-treated liquid is essentially free from inorganic residues and contains principally only polymer in addition to solvent and residual monomer. As a result, the polymer can be separated from the solution by distillation of the solvent, leaving the molten polymer as a residue. The molten polymer may then be cooled off or fed into a melt extruder to be extruded into any desirable shape, such as sheets, ribbons or rods. Alternate methods of polymer separation comprise the addition of solvents such as methanol in sufficient quantities, generally from 30 to 50% by weight of the polymer solution, to cause precipitation of the high molecular weight polymer. The precipitated polymer, solvent and alcohol is passed into a settler maintained at a temperature above the melting point of the polymer. The molten polymer settles and can be continuously removed at the bottom while solvent and alcohol are removed from the top.

The process of the present invention is carried out at temperatures ranging from 125 to 250° C. Since the hydrocarbon solvents employed as reaction media such as cyclohexane, n-decane, benzene and toluene have boiling points which are below the temperatures employed in the purification of the polymer, it is necessary to operate the process under sufficient positive pressure to maintain the hydrocarbon solvents employed as reaction media in the liquid phase. The minimum pressures required will vary with the solvents employed. Beyond the pressure necessary to maintain the polymer in solution and the solvent in the liquid phase, the pressure is not critical. Generally, it was found that pressures in the range of 1000 p.s.i. to 3000 p.s.i. are well suited to maintain the solvents employed in the liquid phase.

The process of the present invention is further illustrated by the following examples:

*Example I*

Into a continuous reactor equipped with an efficient flat blade stirrer was charged 43 lbs. per hour of cyclohexane, 6.7 millimoles per hour of a 4:1 mixture of titanium tetrachloride and vanadium oxytrichloride, 11.9 millimoles per hour of aluminum triisobutyl and 4.3 lbs. per hour of ethylene. The temperature of the reactor was maintained at 250° C. and the pressure at 2500 p.s.i. A 10% polymer solution was obtained. The reactor discharge was passed through a pressure letdown valve, which reduced the pressure from 2500 to 1300 p.s.i. into a mixing vessel maintained at a temperature of 210–220° C. Into the reactor discharge just prior to entering the mixing vessel was injected 10 lbs. per hour of solvent containing 8.6 g. of isopropyl alcohol. The polymer solution was passed from the mixing vessel into a 52" adsorption column having a diameter of 2.875" and containing 8.2 lbs. of 14 to 20 mesh silica at the rate of 58 lbs. per hour. The column was kept at a pressure of 1300 p.s.i. and a temperature of 217° C. The pressure drop across the column was approximately 100 p.s.i.

The solvent was flashed off and molten polyethylene was obtained. The polymer was found to have 5 parts per million of inorganic ash. The removal of metallic catalyst residues was 99% efficient.

*Example II*

Into a continuous reactor equipped with an efficient flat blade stirrer was charged continuously in one hour 50 lbs. of benzene, 15 millimoles of a 4:1 titanium tetrachloride vanadium oxytrichloride mixture, 25.2 millimoles of aluminum triisobutyl and 5.0 lbs. of ethylene. The reactor pressure was maintained at 2250 p.s.i. and the temperature at 238° C. From the reactor there was obtained a 3.3% solution of polymer in benzene. The reactor discharge was passed through a pressure let-down valve, which reduced the pressure to 1350 p.s.i. into a mixing vessel into which 10.9 g. of isopropyl alcohol in 10 lbs. of solvent was added per hour. The reaction mixture was then passed through a 5 ft. long, 25 inch diameter adsorption column containing 8–14 mesh alumina, which had been regenerated by a water treatment. The adsorption column was maintained at a pressure of 1350 p.s.i. and a temperature of 204° C. The solvent was flashed off and a molten polymer was obtained. The polymer was found to contain 40 parts per million of inorganic ash. The catalyst removal step was 98% efficient.

*Example III*

A 7.2% copolymer solution in benzene was prepared by reacting 2.54 lbs. of ethylene with 3.12 lbs. of butene in 21 lbs. of solvent, employing as the catalyst the reaction product from 2.8 millimoles of titanium tetrachloride and vanadium oxytrichloride and 7.9 millimoles of aluminum triisobutyl. The polymer solution was passed into a mixing vessel maintained at a pressure of 1400 p.s.i. and 211° C. and 15.3 g. of isopropyl alcohol in 2.1 lbs. of solvent was added. The resulting solution was passed through 4 ft. long, 1.25 inch diameter column containing 14–20 mesh silica gel. The resulting interpolymer of butene and ethylene was found to have an inorganic ash content of 60 parts per million, representing a 92% removal of the catalyst.

*Example IV*

A 6.9% copolymer solution in cyclohexane was prepared by polymerizing 2.2 lbs. of ethylene with 0.85 lb. of decene-1 in 27 lbs. of cyclohexane, employing as the catalyst the product formed from reacting 6.9 millimoles of a 4:1 titanium tetrachloride, vanadium oxytrichloride mixture with 10.8 millimoles of aluminum triisobutyl. The polymer solution was passed into a mixing vessel maintained at a pressure of 1300 p.s.i. and a temperature of 211° C. and 15.3 g. of isopropyl alcohol in 2.2 lbs. of solvent was added. The resulting solution was passed into a 2 inch diameter, 5 ft. long column containing 8–14 mesh of activated alumina. The resulting polymer, on separation from the solvent, was found to have an inorganic ash content of 70 parts per million, representing a 94% removal of the catalyst.

*Example V*

A 4.1% polymer solution was obtained by polymerizing 6.5 lbs. of ethylene in 50 lbs. of cyclohexane, employing a catalyst formed from 45 millimoles of titanium tetrachloride and 44 millimoles of lithium aluminum tetradecyl. The resulting polymer solution was passed into a mixing vessel maintained at a pressure of 1300 p.s.i. and a temperature of 211° C. To this polymer solution 59 g. of isopropyl alcohol in 10 lbs. of solvent was added. The resulting solution was passed through a 2 inch diameter, 5 ft. long column containing 8–14 mesh silica. The polymer obtained on separation from the solvent was found to have an inorganic ash content of 90 parts per million, representing a 98.5% removal of the catalyst.

*Example VI*

Example I was repeated, employing 15.6 g. of acetylacetone and 23.8 g. of benzylalcohol in place of the isopropyl alcohol. The polymer obtained was found to have an inorganic ash content of 30 parts per million.

It is to be understood that the above examples are given for the purpose of illustrating the present invention only, and that numerous variations of the foregoing examples are possible without departing from the scope of the invention.

Commercially produced adsorbents may be employed in the process of the present invention. Although the branched chain alcohols are preferred, a great number of alcohols may be employed in the process of the present invention, including straight-chain alcohols, aromatic alcohols and alcohols containing two hydroxyl groups, such as ethylene glycol.

The process of the present invention is useful in the preparation of hydrocarbon polymers wihch are substantially free from inorganic catalyst residues where the polymerization involves the use of an organometallic catalyst containing a transition metal in a reduced valence state.

The purified hydrocarbon polymers obtained by using the process of the present invention are greatly improved in stability and color. On melt extrusion and injection molding of ethylene polymers, polymerized with an organometallic catalyst and purified by the present invention, color-free products are obtained. Furthermore, the polymer may be maintained at temperatures above the melting point for long periods of time without being degraded or discolored. The corrosion of process equipment employed in the fabrication of hydrocarbon polymers purified by the present invention is reduced to a minimum.

We claim:

1. A process for removing metallic catalyst residues from a normally solid hydrocarbon polymer, said polymer being obtained through the polymerization of a terminally unsaturated olefin with a transition metal catalyst obtained by admixing a transition metal salt of group IV$b$, V$b$ and VI$b$ of the periodic table of elements with an organometallic reducing agent having at least one metal-to-hydrocarbon bond, which comprises introducing, at a temperature of 125° C. to 250° C., an alcohol of the class consisting of alkyl and aryl alcohols into a polymerization product mixture containing in a liquid inert hydrocarbon medium a dissolved hydrocarbon polymer and a transition metal catalyst residue, the quantity of said alcohol being sufficient to convert said transition element to alcoholate and thereafter contacting said polymerization mixture at a temperature of 125 to 250° C. with an adsorbent selected from the class consisting of silica and alumina, thereby removing said catalyst residues.

2. The process as set forth in claim 1 wherein the alcohol is a branched chain alkyl alcohol.

3. The process as set forth in claim 1 wherein said adsorbent has been treated with water.

4. A process for removing metallic catalyst residues from normally solid polymers of ethylene, said polymer being obtained through the polymerization of ethylene with a transition metal catalyst obtained by admixing a transition metal salt of group IV$b$, V$b$ and VI$b$ of the periodic table of elements with an organometallic reducing agent having at least one metal-to-hydrocarbon bond, which comprises introducing at a temperature of 125° C. to 250° C. a branched chain alkyl alcohol into a polymerization product mixture containing in a liquid inert hydrocarbon medium a dissolved ethylene polymer, and a transition metal catalyst residue, the quantity of said alcohol being sufficient to convert said transition element to alcoholate and thereafter contacting said polymerization mixture at a temperature of 125 to 250° C. with an adsorbent selected from the class consisting of silica and alumina, thereby removing said catalyst residues.

5. The process as set forth in claim 3 wherein the branched chain alkyl alcohol is isopropyl alcohol.

6. The process as set forth in claim 3 wherein the branched chain alkyl alcohol is isobutyl alcohol.

7. The process as set forth in claim 3 wherein the metallic catalyst is the product formed by admixing a titanium halide with an aluminum trialkyl.

8. The process as set forth in claim 3 wherein the metallic catalyst is the product formed by admixing a titanium halide and a vanadium halide with an aluminum trialkyl.

9. The process as set forth in claim 3 wherein the liquid hydrocarbon is cyclohexane.

10. The process which comprises introducing a branched chain alkyl alcohol into an ethylene polymerization product mixture, containing an inert liquid hydrocarbon, a normally solid polymer of ethylene and the catalyst residue of a catalyst formed by admixing a titanium halide with a compound of aluminum having aluminum attached directly to a hydrocarbon group, heating the resultant mixture at a temperature of 175 to 225° C. under a pressure of at least 1000 p.s.i. until the titanium is converted into titanium alkoxide, contacting the polymerization mixture at a temperature of 175 to 225° C. and a pressure above 1000 p.s.i. with an adsorbent selected from the class consisting of alumina and silica, and recovering a polymer solution essentially free of metallic catalyst residues.

References Cited in the file of this patent

UNITED STATES PATENTS

| | | |
|---|---|---|
| 2,101,558 | Nealon | Dec. 7, 1937 |
| 2,827,445 | Bartolomeo | Mar. 18, 1958 |

FOREIGN PATENTS

| | | |
|---|---|---|
| 533,362 | Belgium | May 16, 1955 |